Aug. 11, 1959 J. D. JOHANNESEN ET AL 2,899,570
SWITCHING CIRCUIT
Filed March 9, 1956

INVENTORS J. D. JOHANNESEN
P. B. MYERS
J. E. SCHWENKER
BY James W. Falk
ATTORNEY United States Patent Office 2,899,570
Patented Aug. 11, 1959

2,899,570

SWITCHING CIRCUIT

John D. Johannesen, Morris Plains, Peter B. Myers, Millington, and John E. Schwenker, Gillette, N.J., assignors to Bell Telephone Laboratories, Incorporated, New York, N.Y., a corporation of New York Application March 9, 1956, Serial No. 570,530

8 Claims. (Cl. 307—88.5)

Figure 1:
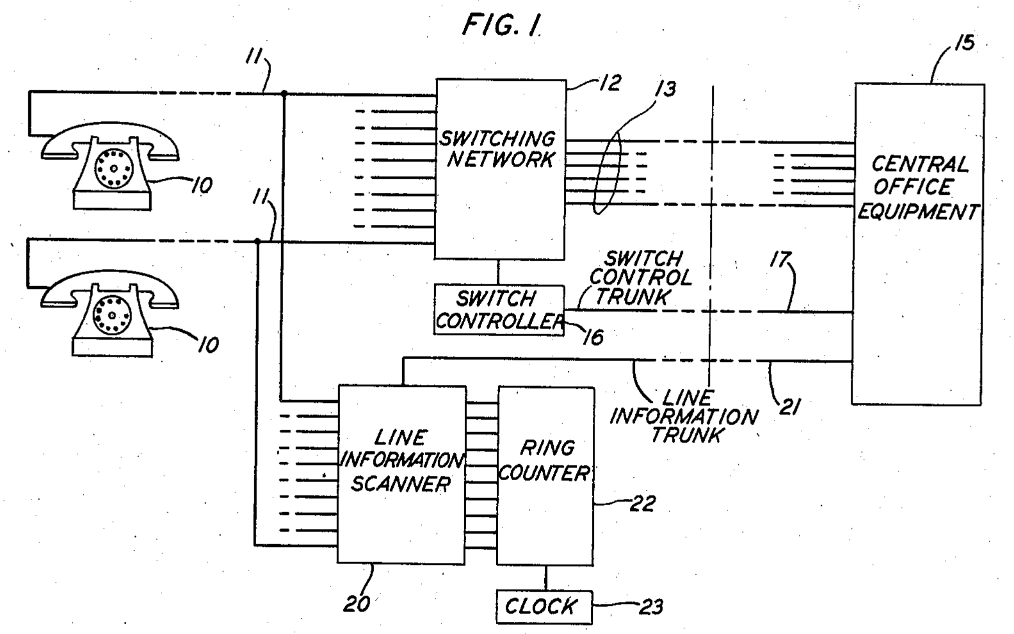

This invention relates to electrical switching circuits and more particularly to electrical gating networks applicable to information handling systems.

In many types of present-day high-speed information handling systems it frequently is desirable to provide a gating network having the characteristics of essentially infinite impedance to current flow in either direction when in the nonconducting state, essentially zero impedance in both directions when in the conducting state, electronic operation to enable switching at high speeds, and isolation of the current transmission path from the gate control circuitry. Such a network could find utility, for example, in various electrical and telephone systems where a plurality of conductors or lines are rapidly scanned to connect a single apparatus or equipment to each of a plurality of lines.

One system of this type is shown in K. S. Dunlap and C. A. Lovell application Serial No. 302,371, filed August 2, 1952, now Patent 2,774,822, granted December 18, 1956, and Patent 2,715,658, granted August 16, 1955, and comprises a remote line concentrator or satellite system wherein a large number of subscriber lines are connected to a central office through a satellite office and a smaller number of trunks extending between the offices. In such a telephone system a number of satellite switches are controlled from the central office to effect the desired connections between the trunks and subscriber lines, thereby resulting in considerable savings in the wire or copper required for the subscriber loops. However, as the subscriber lines themselves thus are not in information communication with a central office, it is necessary that some means be provided in the satellite office for transmitting to the central office information as to the condition at all times of any of the subscriber lines. Thus, it is necessary in some systems of this type to have means in the satellite office which continuously scans the information condition of the subscriber lines and reports the same to the central office. In the interest of efficient information transmission this scanning means should have the characteristics of the gating network described above.

While this invention will be described with reference to telephone systems and more particularly with reference to a telephone system of the type described in the Dunlap and Lovell patent, it is to be understood that it is not to be considered as limited to telephone applications alone. Other applications may be in the field of computers, telegraph communication systems, data transmission systems, or any other systems where high-speed gating circuits are required.

It is a general object of this invention to provide an improved high-speed gating circuit.

More specifically it is an object of this invention to provide an improved high-speed scanning network capable of transmitting information from a number of remote lines to a central station.

It is a further object of this invention to provide a high-speed gating network capable of presenting effectively zero impedance to current flow in either direction when in the conducting state and essentially infinite impedance to current flow in either direction when in the nonconducting state.

It is a further object of this invention to provide a high-speed gating network wherein the control and signal paths are electrically isolated from each other.

These and other objects of this invention are attained in one specific illustrative embodiment wherein a scanning network comprises a plurality of transistor and magnetic core gates. Each gate circuit, in accordance with our invention, comprises a pair of similar conductivity type transistor elements having common base and common emitter connections, and a magnetic core having a substantially rectangular hysteresis characteristic, as is known in the art, an output winding connected between the commonly connected bases and emitters, and an input or drive winding.

One collector of the back-to-back connected transistor units is connected to an individual subscriber line from which it is desired to obtain information; the other collector of the back-to-back connected transistor units is connected to a common information trunk extending to a remote central office. The gate circuits are activated by drive pulses applied to the drive winding of the magnetic cores, as from a ring counter applying pulses to each gate core in sequence.

In accordance with an aspect of this invention the gate circuit is activated, to allow passage of signals therethrough, by applying a drive pulse to the magnetic core to reverse the state of magnetization of the core. The core, in shifting its state of magnetization, transmits energy to its output winding and thence to the two transistor units, and specifically, current appearing at the output winding of the core due to the core state reversal is forced through the transistor to inject minority carriers into the base material of the transistors. In this way the base material of each transistor of the gate is flooded with minority carriers and the transistor junctions are reduced to their low impedance states.

In accordance with another aspect of our invention positive deactivation of the gate circuit is aided by applying a reset pulse to the drive winding of the magnetic core immediately succeeding the activating drive pulse. Because of the peculiarities of carrier storage and removal in transistors and of magnetic core switching under various loads applied to the secondary or output windings of the cores, we have found that rapid turn-off of the gate may be attained by combinations in accordance with our invention.

Specifically, in embodiments of our invention wherein back-to-back connected transistors are controlled through a magnetic core we have found that a reset pulse applied to the core to turn off the gate and reset the core will initially find the output winding of the core heavily loaded by the transistors; this is because of the presence of the minority carriers in the transitors causing them to be in their low impedance state. Accordingly, initially most of the reset pulse power is applied, through the output winding, to the transistors to build up the desired field in the base material between the emitter and the base of the transistor in the direction such that the minority carriers are swept away from the collector junction. Once this field is established, the process of carrier removal tends to become more efficient, since the minority carriers tend to move away from regions of high gradient and thus concentrate the field still more.

Accordingly, the reset pulse applied to the core in accordance with our invention initiates the desired process within the transistors for rapid turn-off. At the same time as the minority carriers in the transistors yield to the reverse fields thus set up, the base-to-emitter impedance increases. This decreases the apparent load on the core output winding and permits more power of the reset pulse to be utilized in switching the magnetic state of the core. Accordingly, the core will switch faster, thereby further increasing the output voltage of the secondary winding and hence the sweep-out field in the transistors.

In this manner in accordance with our invention the individual characteristics of the transistors and cores are made to complement each other and attain the desired rapid turn-off of the gate circuit.

Further, because of the utilization of the magnetic core in embodiments of our invention, the control and signal paths are electrically isolated. Thus, no bias votlages need be applied from the control circuitry directly into or onto the signal path, as in prior gate circuits. In addition to the above-noted advantages of isolation of signal and control circuitry and fast and positive switching action in either activating or deactivating the signal path, gating circuits in accordance with our invention have low power requirements, with no power drain when not being utilized in setting up a signaling connection.

It is a feature of this invention that a transistor device or devices define a pair of junctions having normally high impedances to signals of respectively opposite polarities and that a magnetic core having a substantially rectangular hysteresis characteristic have an output winding connected to one side of each of the junctions to supply minority carriers in the vicinity of the junctions and thereby reduce them to their low impedance states for signals of both polarities during reversal of the state of magnetization of the core.

It is another feature of this invention that the transistor device or devices comprise the series combination of a pair of base members of one type conductivity and members of opposite type conductivity contiguous thereto and defining a pair of junctions therewith, one junction with each base member having a normally high impedance to signals of respectively opposite polarity and the other junction having a secondary winding of the magnetic core connected thereacross for producing the minority carriers in the vicinity of the one junctions on reversal of the state of magnetization of the core.

It is still another feature of this invention that transistors be connected to have common base and common emitter connections but distinct collector terminals, thereby defining a gate signal path between the collector terminals, and that a magnetic core having a substantially rectangular hysteresis characteristic have an output winding connected between the common emitter and base connections.

It is a further feature of this invention that the gate circuit be activated and deactivated by applying in succession pulses to a drive or input winding on the magnetic core. Further in accordance with this feature of the invention the activating drive pulse initially sets the state of magnetization of the core in one direction and in so doing floods the base regions of the transistors with minority carriers and the reset or deactivating pulse resets the state of magnetization of the core and serves rapidly to sweep out the minority carriers from the base region.

It is a still further feature of this invention that the individual characteristics of removal of excess minority carriers in transistors and of core resetting be utilized in combination to attain rapid and positive turn-off of the gate circuit.

Figure 2:
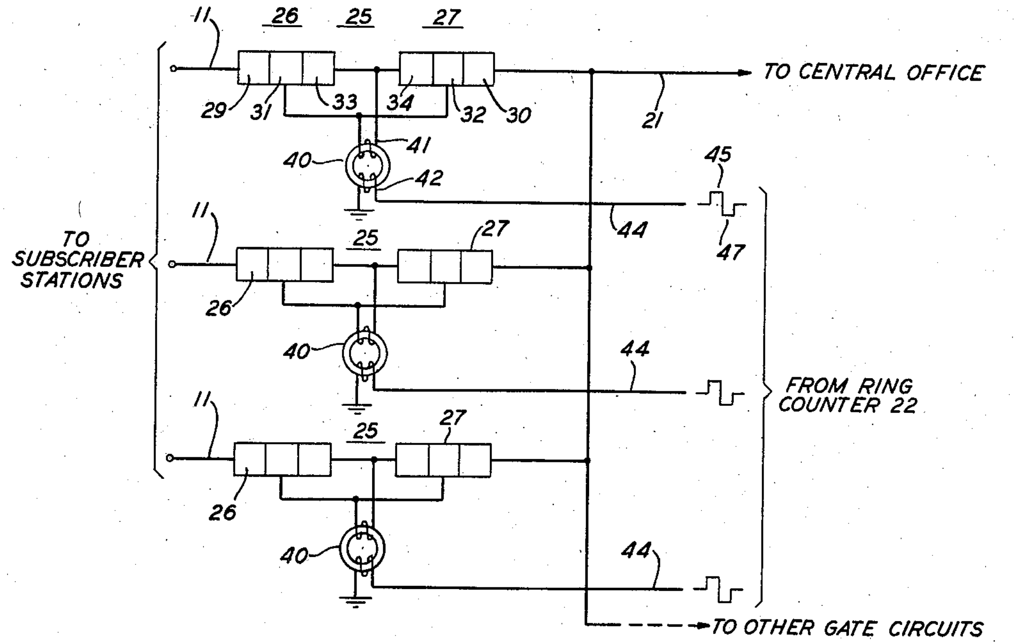

A complete understanding of these and other features of this invention may be gained from consideration of the following detailed description, together with the accompanying drawing, in which:

Fig. 1 is a schematic representation in block diagram form of a telephone system in which gating and switching circuits in accordance with this invention may be employed; and Fig. 2 is a schematic representation of one illustrative embodiment of a scanning network in accordance with this invention that may be employed in the telephone system of Fig. 1.

Turning now to the drawing, there is depicted in Fig. 1 a telephone system of the type disclosed in K. S. Dunlap and C. A. Lovell application Serial No. 302,371, filed August 2, 1952, now Patent 2,774,822, granted December 18, 1956, and Patent 2,715,658, issued August 16, 1955, and wherein circuits in accordance with our invention may advantageously be employed. In this system a plurality of subscriber telephones 10 are individually connected to subscriber lines 11 and may be selectively connected by a remote switching network 12 to any of a smaller plurality of trunks 13.

The trunks 13 extend between central office equipment 15 in a central office and the satellite or remote switching network 12. Connections between the lines 11 and trunks 13 may be made and broken by a switch controller circuit 16, which may be of the type disclosed in the above-mentioned application, under control of signals transmitted from the central office equipment 15 over a switch control trunk 17.

Information as to the condition of the subscriber line and as to whether it is idle, busy on an established connection, or desiring to have a connection established to it is obtained by a line information scanner 20, which may advantageously be in accordance with our invention as depicted in Fig. 2. The scanner sequentially establishes and disestablishes connections between the individual lines 11 and, through a line information trunk 21, the central office equipment 15. These connections and disconnections occur rapidly and in a continuous sequence under control of a ring counter circuit 22 and a clock circuit 23. The ring counter circuit 22 may be of any type known in the art but may advantageously comprise magnetic cores and be of the type disclosed in M. Karnaugh Patent 2,719,961, issued October 4, 1955, in which case the clock circuit 23 provides two-phase clock pulses to the counter 22.

One specific illustrative embodiment of a scanning circuit in accordance with this invention is depicted in Fig. 2 and comprises a plurality of transistor and magnetic core gate circuits 25. As there seen, each of the gate circuits 25 comprises a pair of transistors 26 and 27, which may advantageously be of the alloy junction type, connected back-to-back in series in the signal path. The transistors 26 and 27 may both be either p-n-p or n-p-n types, providing the control pulses are in proper polarity sequence. Each transistor 26 and 27 comprises a collector region 29 and 30, a base region 31 and 32, and an emitter region 33 and 34, the emitters 33 and 34 being connected directly together, and the bases 31 and 32 being directly connected together.

The signal terminals of the gate circuit 25 are the two collectors, one of which, collector 29, is connected to an individual subscriber line 11 and the other of which, collector 30, is connected to the common line information trunk 21 to the central office equipment 15. Accordingly, no matter what the polarity of the voltage impressed on the gate circuit 25 in its off condition, one of the transistors 26 and 27 has its collector reverse biased and thereby presenting a high series impedance in the signal path.

Control of the gate circuit 25 is effected by driving a current from the common base connection to the common emitter connection. In accordance with an aspect of this invention this is attained by means of a magnetic core 40 having a substantially rectangular hysteresis characteristic, and having a single output or secondary winding 41 and a single drive or primary winding 42. The output winding 41 is electrically connected between the common base lead and the common emitter lead. The drive winding 42 is connected between a ground or reference potential and one output lead 44 of the ring counter circuit 22.

The operation and advantages of gate circuits in accordance with this specific embodiment of our invention can readily be understood from the following discussion. Let us assume that the magnetic core 40 of a gate circuit is in a state of magnetization, which we shall refer to as the unset state, so as to be set by a positive pulse 45 appearing on lead 44 from the counter 22. The transistor and core gate 25 is then activated, i.e., put into its low impedance state, when the constant current pulse 45 is applied to the drive winding 42 of the unset core 40. The pulse changes the state of magnetization of the core 40 and thereby sets the core; in so doing, the core transmits energy to its output winding 41 and thence to the transistors 26 and 27. The current appearing in the output winding 41 is forced through the pair of transistors 26 and 27 between the base and emitter terminals in such a direction that minority carriers are injected into the base material. These minority carriers flood the base material and serve to reduce any back-biased and therefore high impedance junction to a low impedance state.

The transistor gate 25 will remain in this low impedance state as long as the base regions can supply the collector junctions with an adequate number of minority carriers. Accordingly, the gate circuit disclosed in Fig. 2 and in accordance with our invention will remain in its low impedance state until the first of the following two possible events occurs. If the core 40 becomes completely set, i.e., if all its magnetic domains reverse their polarity before the end of the control pulse 45, the magnetic flux in the core 40 ceases to change, the output winding 41 ceases to be inductively coupled to the drive winding 42, and current ceases to flow from base to emitter within the transistors 26 and 27. A second possibility is that the control pulse 45 ends before the core 40 has finished being set. In either case, the effect is to end the flow of current between the base and emitter of each transistor.

When this enabling current in the transistor ceases, the transistors maintain their low impedance condition only until the minority carriers present in the base disappear. These minority carriers may be lost through recombination, may be used by the signal current flowing through the gate, or they may be swept out by some means. In accordance with an aspect of our invention, the magnetic cores 40 are also employed in sweeping out the excess minority carriers after the pulse 45 has terminated.

It has been known in the art that the effective return of a high impedance state of most transistors is delayed beyond the end of the activating pulse by a few tenths of a microsecond or more, as discussed above. While this delay time might be considered short, in actuality in scanning and gating circuits of the type to which our invention is applicable, this may be a significant portion of the scanning or gating period. The phenomenon that causes this has been called "carrier storage" and has been attributed to the presence of excess minority carriers in the base region of the transistor. The termination of the enabling pulse applied to the transistor brings the injection of new minority carriers to an end, but as long as any minority carriers exist in the base material near the collector junction, the transistor remains in the low impedance state.

In accordance with an aspect of our invention excess minority carriers are swept away from the collector junction immediately on cessation of the enabling pulse, due to the drive pulse 45 applied to the core 40, by directly applying a reset pulse 47 to the core 40. At the beginning of the reset pulse 47, the base region of the transistor is still full of minority carriers and the impedance to reverse current in the gate is very low. The output winding 41 of the core is thus heavily loaded. It is a property of magnetic cores, having a substantially rectangular hysteresis characteristics, that the rate at which the state of magnetization can be changed, e.g., the rate at which they can be reset, by a given pulse is dependent on the secondary or output loading; the heavier the load, the slower the core will switch for a given drive. Accordingly, when the reset pulse 47 is first applied, the core will tend to switch slowly and the transformer action of the core will put most of the reset pulse power into the base-to-emitter region of the transistors. As the minority carriers begin to yield to the reverse field, the base-to-emitter impedance goes up, decreasing the load on the core. The decreased secondary loading permits the core to switch faster and this increases the output voltage of the secondary winding 41 and hence the sweep-out field in the transistor.

In this manner in accordance with our invention the magnetic core is used to greatest advantage in providing the environment requisite for rapid removal of the excess minority carriers. It is known that a good way of reducing the carrier storage effect is to apply a field in the base material between the emitter and base in such a direction that minority carriers are swept away from the collector junction. Priorly, considerable difficulty has been encountered because while surplus minority carriers remain, the entire transistor is in a low impedance state and it is very difficult to start building up a field between the emitter and the base. Once such a gradient gets started, however, the process is cumulative, since minority carriers tend to move away from regions of high gradient and thus concentrate the field still more. Because of the characteristics of the magnetic core in combinations in accordance with our invention its electrical properties enable attainment of the field gradient for rapid removal of the excess minority carriers.

The operation of this specific illustrative embodiment of our invention is resetting the gate circuit can also be understood by considering the effective core impedance and the effective reverse transistor impedance as two parallel branches of an equivalent circuit, to which branches a constant current pulse drive is applied. At the beginning of the reset pulse, the equivalent core impedance is high with respect to the effective transistor impedance, as seen at the output winding; hence, very little of the reset drive power goes into switching the core and almost all the initial power is applied to shutting off the transistors. As the current is applied, the effective transistor impedance goes up and more of the applied power is dissipated in the effective core impedance, which causes the core to switch at an increasing rate until the core is completely reset. After this time the effective core impedance is very low, and may be considered as zero, and the effective transistor impedance is very high to the reverse base current.

The impedance of the gate 25 in the "on" condition is a function of the driving pulse 45 from the ring counter 22. The greater the control current forced through the transistors from base to emitter, the lower the gate resistance. Two factors limit the drive current applied to the transistors 26 and 27: first is the allowable power that can be dissipated in the units, and second is the degree of saturation into which the units are forced. The dissipation is created by the control current flowing through the internal base resistance of the transistors and applies the first limitation. As to the second limitation, this is related to the scanning frequency, as saturation is only detrimental to the gate with regard to the time required for resetting the gate, as a greater number of minority carriers must be swept out.

Turning again to Fig. 2, it can be seen that the signal path for information signals is from a subscriber line 11 through the transistors 26 and 27 to the common scanning line information trunk 21, whereas the control circuit is from the ring counter 22 solely to the core 40. Accordingly, in accordance with an aspect of our invention the magnetic core 40 provides isolation between the control circuit and the signaling path, the only coupling in the pulse-off state being capacitive between the output and drive windings 41 and 42 on the core. Further, because of the balanced nature of the gate a closed circuit is provided in the signal path without the introduction of the control pulse on the signal. Because of the symmetrical configuration of the gate circuit, even the small voltage drops in the individual transistors between emitter and collector tend to be balanced out of the signal path.

It can further be appreciated that in gate and scanning circuits in accordance with our invention there are no bias currents or voltages either in the signal or in the control paths. Accordingly, we have provided a simple and fast responding gate circuit with isolation of control and signal circuits, with no interposition of bias voltages or currents in the signal path, and with rapid turn-off of the gate due to the matching characteristics of the elements of our combination, as discussed above.

While our invention has been disclosed with reference to a scanning and gate circuit wherein the transistors 26 and 27 are distinct elements, it is to be understood that, as these transistors have common emitter and base connections, they may be fabricated in a single unit having a common emitter and base but distinct collectors. In such a unit the two collectors should be physically separated sufficiently to prevent interaction except through the common emitter.

As is known, whenever a pulse is applied to a magnetic core having a substantially rectangular hysteresis characteristic or whenever such a pulse terminates, a transient voltage spike may be present at the output winding of the core. Such spurious spikes are generally in a direction to aid the operation of the gating circuit, by providing additional minority carriers at the commencement of the drive pulse or to aid in establishing the desired field for removal of minority carriers, at commencement of the reset pulse. However, we have found that, in certain instances, a spurious or transient spike may occur on cessation of the reset pulse which would tend erroneously to turn the gate on again. This may advantageously be inhibited in various ways known in the art; thus, a capacitor, or diode may be connected across the output winding 41 to prevent an erroneous reopening of the signal path due to current induced by the cessation of the reset pulse again introducing minority carriers into the transistor base regions.

Reference is made to application Serial No. 570,593, filed March 9, 1956, of P. B. Myers, wherein a related invention is disclosed and claimed.

It is to be understood that the above-described arrangements are illustrative of the application of the principles of the invention. Numerous other arrangements may be devised by those skilled in the art without departing from the spirit and scope of the invention.

What is claimed is:

1. A gating circuit comprising a serial signal path including transistor means defining a first junction having a normally high impedance to signals of one polarity and a second junction having a normally high impedance to signals of the opposite polarity and control means for supplying minority carriers in the vicinity of said junctions to reduce them to their low impedance states for signals of both polarities, said control means including a magnetic core having a substantially rectangular hysteresis characteristic and having output winding means connected to one side of each of said junctions and means for reversing the state of magnetization of said core.

2. Electrical switching apparatus for transferring signals from a first point to a second point in response to control signals comprising in combination a first and a second transistor, each transistor having an emitter, a base and a collector, a first conductor interconnecting said bases, a second conductor interconnecting said emitters, said collectors being connected to said first and second points, respectively, a magnetic core characterized by a substantially rectangular hysteresis loop and having two windings thereon, one terminal of the first winding being connected to said first conductor, the other terminal of said first winding being connected to said second conductor, and means for applying control signals to the second winding.

3. A gating circuit comprising a pair of similar conductivity type transistors each having an emitter, a base, and a collector, first means conductively connecting said emitters together, second means conductively connecting said bases together, a magnetic core having a substantially rectangular hysteresis characteristic and having a two terminal output winding thereon, and means connecting said terminals of said output winding to said first and second means respectively.

4. A gating circuit comprising transistor means including a pair of distinct collectors of similar conductivity type semiconductor material, a pair of distinct bases, and emitter means common to said bases, said distinct collectors defining with said distinct bases a first pair of junctions, said emitter means defining with said distinct bases a second pair of junctions, a magnetic core having a substantially rectangular hysteresis characteristic and a pair of two terminal windings thereon, means conductively connecting said distinct bases together, one of said windings being connected between said means connecting said distinct bases and said emitter means, and means for applying to the other of said windings a first pulse to switch the state of remanent magnetization of said core and to place said distinct junctions in their low impedance states and for applying a second pulse immediately subsequent to said first pulse to reset said core and to return said distinct junctions to their high impedance states.

5. A gating circuit comprising a pair of similar conductivity type transistors each having an emitter, a base, and a collector, said bases being conductively connected together and said emitters being conductively connected together, a magnetic core having a substantially rectangular hysteresis characteristic, a two terminal output winding on said core connected between said commonly connected emitters and said commonly connected bases, an input winding on said core, and means for applying pairs of oppositely poled serial pulses to said input winding to set and to reset said core.

6. A switching network comprising a plurality of individual lines, a single line, a plurality of gate circuits connecting each of said plurality of lines to said single line, each of said gate circuits comprising a pair of similar conductivity type transistors each having a collector, an emitter, and a base, said emitters being electrically connected together, said bases being electrically connected together, one of said collectors being connected to one of said individual lines and the other of said collectors being connected to said single line, and said gate circuits each also including a magnetic core having a substantially rectangular hysteresis characteristic, means for coupling said core to said bases and emitters, and means for applying signal pulses selectively to said gate circuit magnetic cores to control the establishment and disestablishment of signal paths from said individual lines to said single line.

7. A switching network in accordance with claim 6 wherein said means for coupling said core to said bases and emitters includes a two terminal output winding on each of said cores, one terminal of said output winding connected to said electrically connected emitters, the other terminal of said output winding connected to said electrically connected bases, and an input winding on each of said cores, said means for applying signals to said gate circuit magnetic cores comprising means for successively applying set and reset pulses to each input winding of said gate circuit magnetic cores.

8. A gating circuit comprising a signal path including transistor means defining, in the order named, a collector, a base, emitter means, a base, and a collector, means electrically connecting said bases together, and control means for changing the impedance state of the collector-base junctions in said signal path, said control means comprising a magnetic core having a substantially rectangular hysteresis characteristic and having an output winding connected to said common emitter and said bases and an input winding and circuit means applying control pulses to said input winding to set and reset said core, whereby said signal path is electrically isolated from said circuit means.

References Cited in the file of this patent

UNITED STATES PATENTS

| | | |
|---|---|---|
| 2,535,303 | Lewis | Dec. 26, 1950 |
| 2,710,928 | Whitney | June 14, 1955 |
| 2,745,038 | Sziklai | May 8, 1956 |
| 2,761,909 | Wallace | Sept. 4, 1956 |